(12) United States Patent
Moores, Jr. et al.

(10) Patent No.: US 7,736,792 B2
(45) Date of Patent: Jun. 15, 2010

(54) BATTERY COOLING SYSTEM

(75) Inventors: Robert G. Moores, Jr., Reistertown, MD (US); Rouse R. Bailey, Jr., New Park, PA (US); Robert Bradus, Bel Air, MD (US); John R. Cochran, Baltimore, MD (US); Lee W. Ramstrom, Hunt Valley, MD (US); Fred S. Watts, Shrewsbury, PA (US); Paul S. White, Ellicott City, MD (US); Daniele C. Brotto, Baltimore, MD (US); Janet M. Embrey, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 1194 days.

(21) Appl. No.: 11/327,207

(22) Filed: Jan. 9, 2006

(65) Prior Publication Data

US 2006/0110656 A1    May 25, 2006

Related U.S. Application Data

(63) Continuation of application No. 10/223,908, filed on Aug. 20, 2002, now Pat. No. 7,014,945, which is a continuation of application No. 09/566,567, filed on May 8, 2000, now Pat. No. 6,645,666, which is a continuation-in-part of application No. 09/035,586, filed on Mar. 5, 1998, now Pat. No. 6,455,186.

(51) Int. Cl.
H01M 2/12    (2006.01)
H01N 10/50   (2006.01)

(52) U.S. Cl. ................... 429/71; 429/83; 429/120; 429/123

(58) Field of Classification Search ........... 429/71, 429/82, 83, 120, 123, 148, 159
See application file for complete search history.

(56) References Cited

U.S. PATENT DOCUMENTS

| 3,814,630 | A | * | 6/1974 | Bjorkman | 429/120 X |
| 5,173,378 | A | * | 12/1992 | Brown et al. | 429/120 |
| 6,335,116 | B1 | * | 1/2002 | Yamane et al. | 429/120 X |
| 7,014,945 | B2 | * | 3/2006 | Moores et al. | 429/71 |

* cited by examiner

Primary Examiner—Stephen J. Kalafut
(74) Attorney, Agent, or Firm—Michael Aronoff; Adan Ayala

(57) ABSTRACT

A cordless power tool has a housing which includes a mechanism to couple with a removable battery pack. The battery pack includes one or more battery cells as well as a vent system in the battery pack housing which enables fluid to move through the housing. A mechanism is associated with the battery pack to dissipate heat from the battery pack.

19 Claims, 12 Drawing Sheets

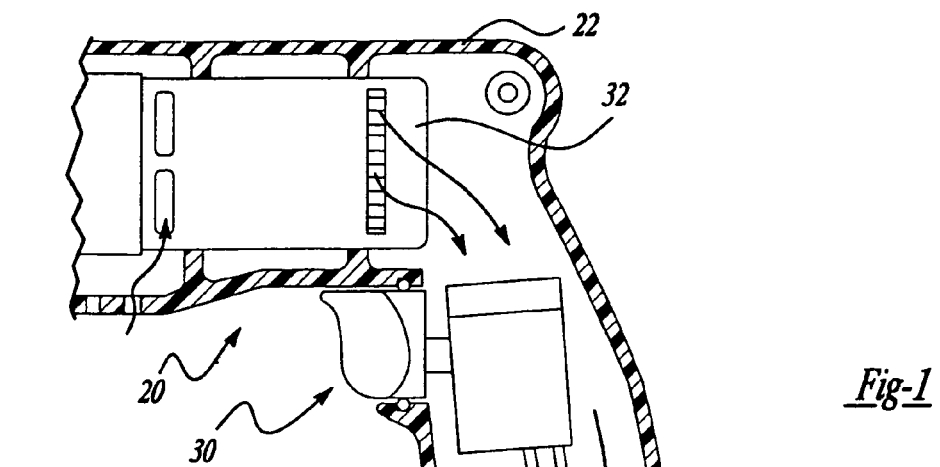
*Fig-1*
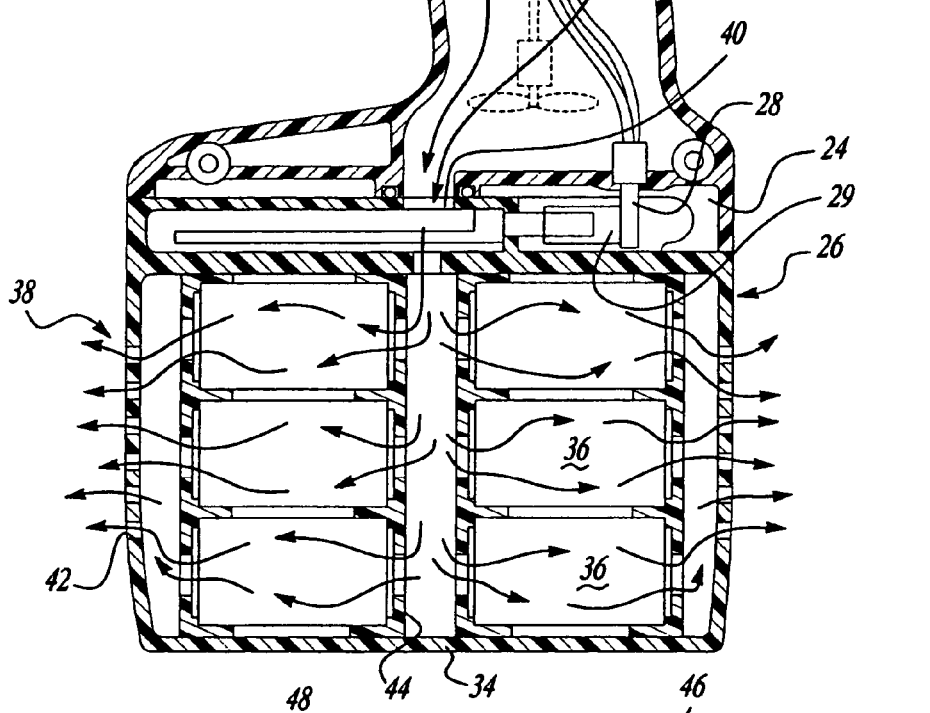
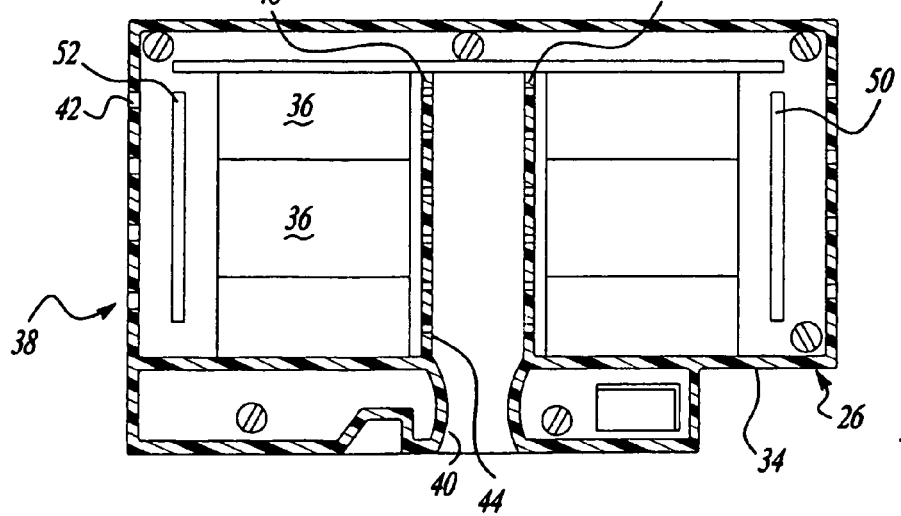
*Fig-2*

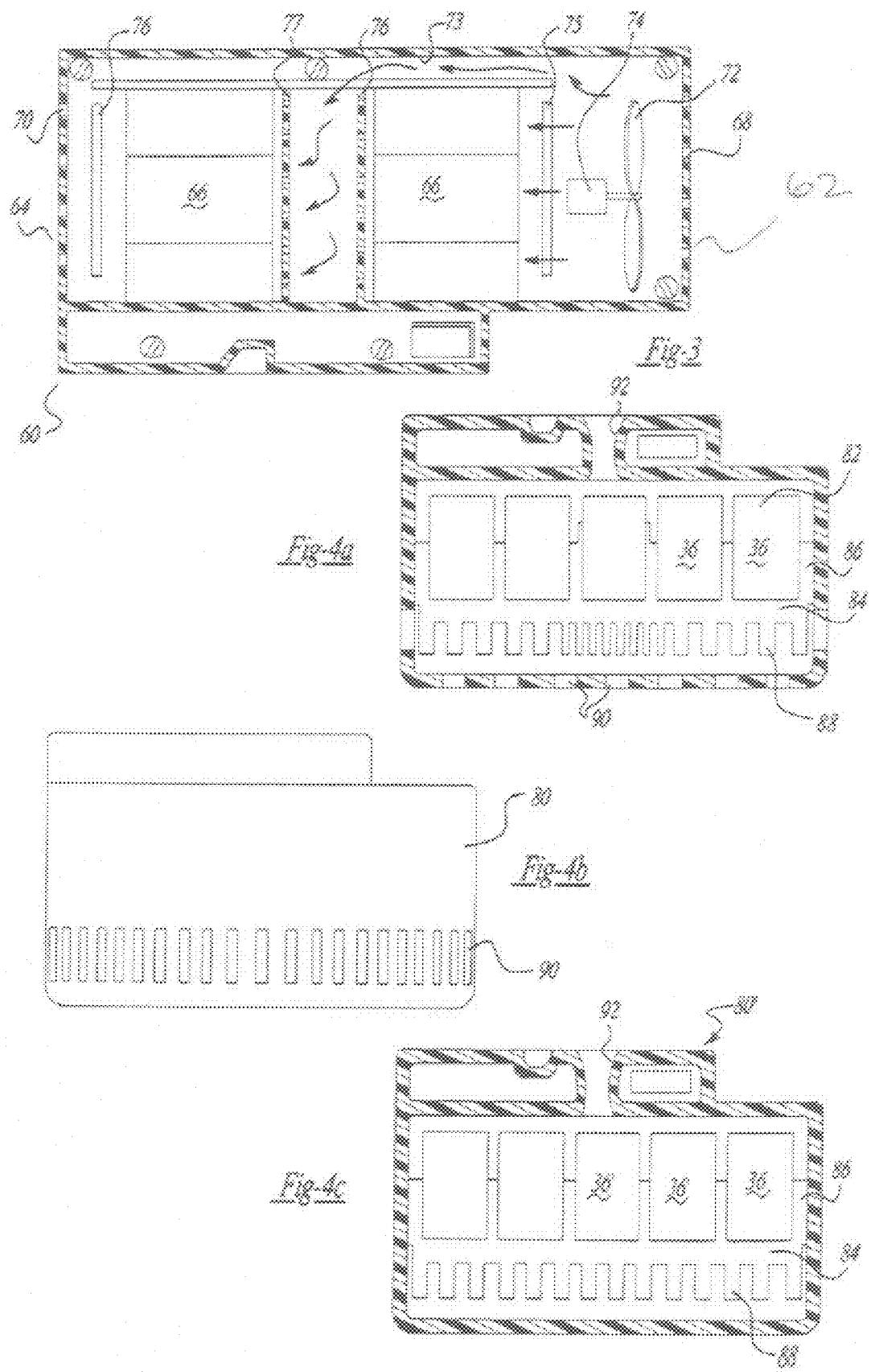

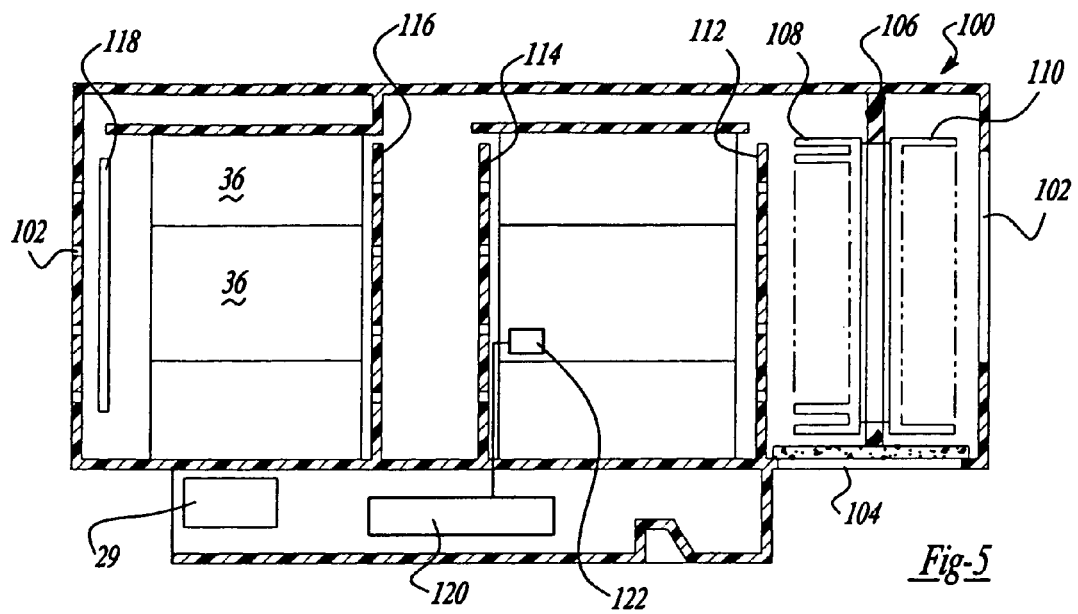
_Fig-5_
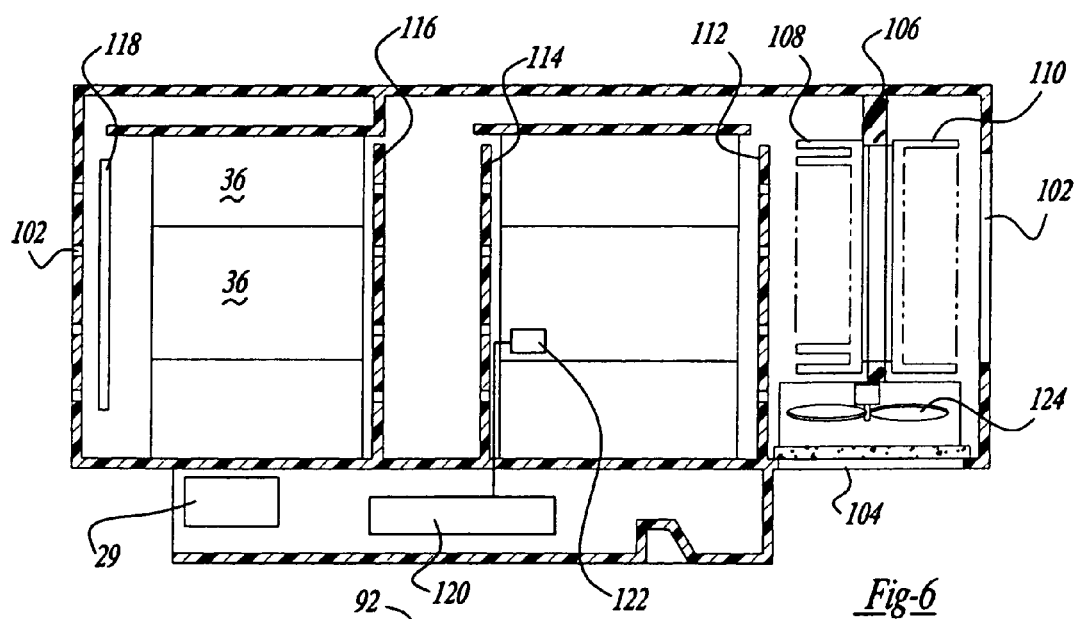
_Fig-6_
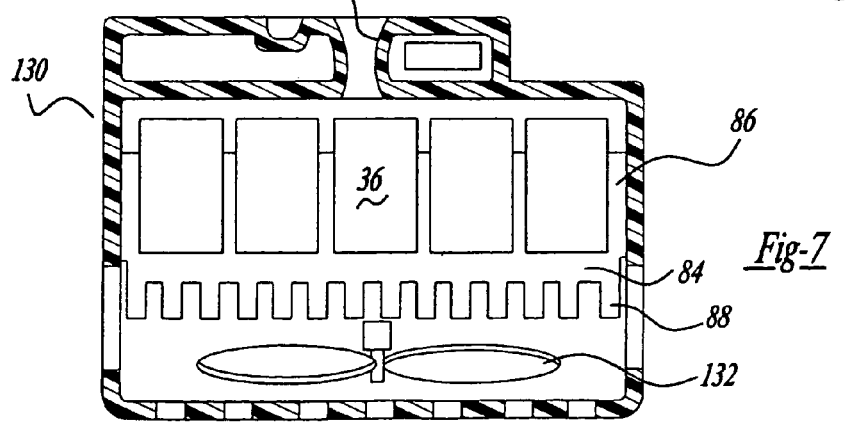
_Fig-7_

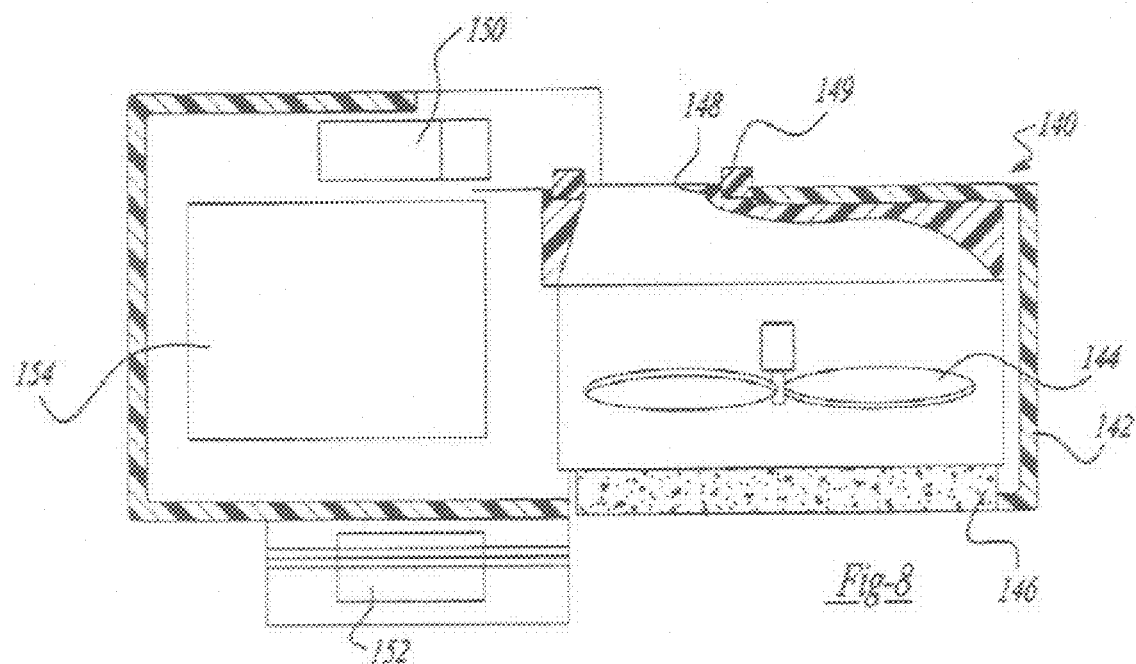
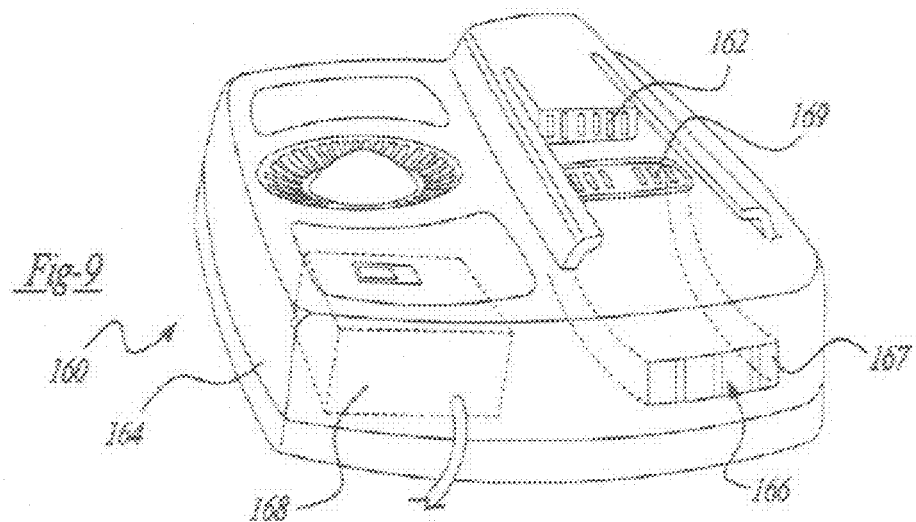
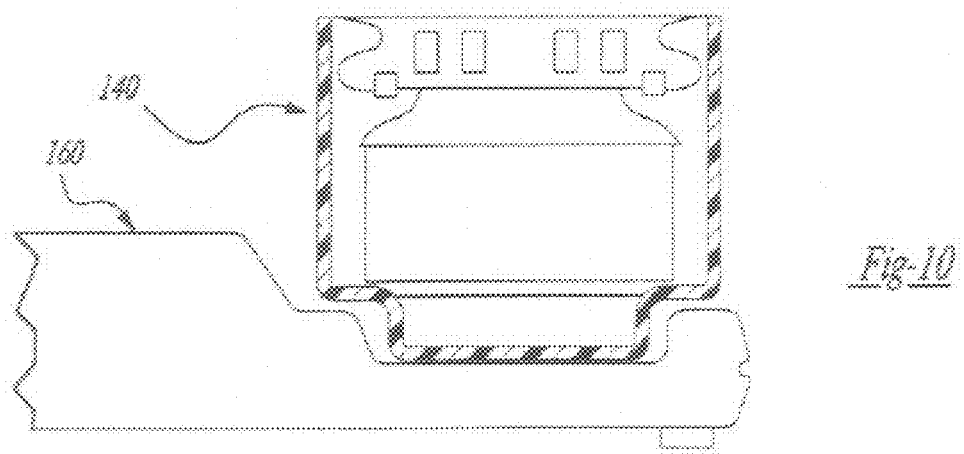

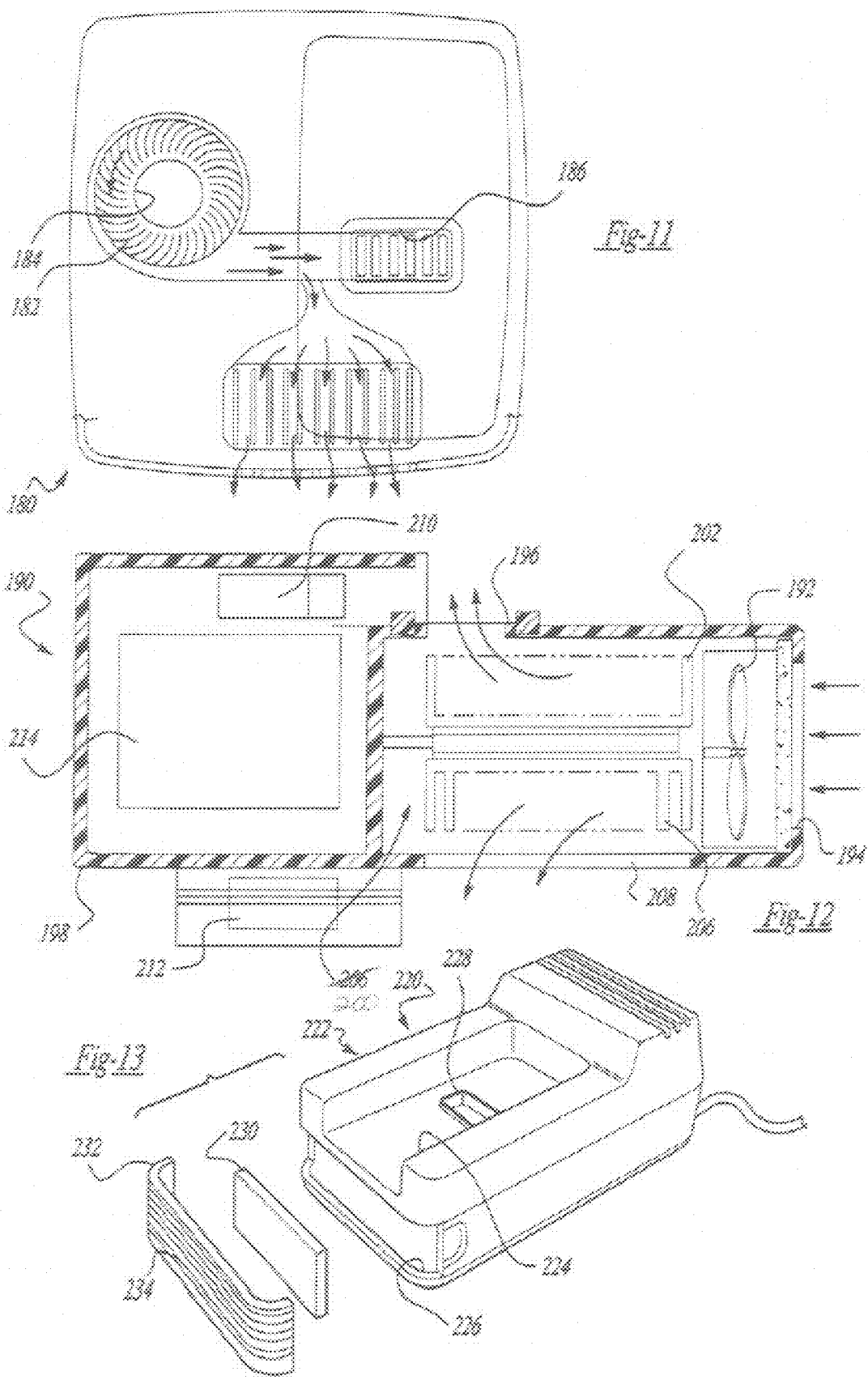

BATTERY COOLING SYSTEM

CROSS-REFERENCE TO RELATED APPLICATIONS

The present application is a continuation of U.S. application Ser. No. 10/223,908, filed on Aug. 20, 2002, now U.S. Pat. No. 7,014,945, which is in turn a continuation of U.S. application Ser. No. 09/566,567, filed on May 8, 2000, now U.S. Pat. No. 6,645,666, which is in turn a continuation-in-part of U.S. application Ser. No. 09/035,586, filed Mar. 5, 1998, now U.S. Pat. No. 6,455,186.

BACKGROUND OF THE INVENTION

The present invention relates to battery cooling systems and, more specifically, to systems for cooling batteries for cordless power tools.

Cordless products which use rechargeable batteries are prevalent throughout the workplace as well as in the home. From housewares to power tools, rechargeable batteries are used in numerous devices. Ordinarily, nickel-cadium or nickel metal-hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

As the cordless power device is used, current flows through the batteries to power the cordless device. As current is drawn off the batteries, heat is generated within the battery pack. Also, during charging of the battery pack, heat is likewise accumulated during the charging process. The heat created during discharge of the batteries as well as charging of the batteries which, in turn, leads to increased temperatures, may have a severe effect on the life expectancy and performance of the batteries. In order for batteries to properly charge, the batteries must be below a desired threshold temperature and the differential temperature between the cells in the battery pack should be minimized. Likewise, if the batteries become too hot during use, battery life will be cut short. Also, if a battery is below a certain threshold temperature, it will be too cold to charge and must be warmed before charging. Thus, it is desirous to maintain batteries within a desired temperature range for optimum performance as well as optimum charging.

Further, battery packs typically contain some battery cells close to the outer walls of the pack, while some battery cells are surrounded by other battery cells. Those cells close to the outer walls have better thermal conductivity to the outside ambient than do the cells that are surrounded by other cells. When a battery pack is discharging on the cordless device, the amount of heat generated is approximately the same in each cell. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to a decline in the performance of the entire pack.

SUMMARY OF THE INVENTION

The present invention provides the art with a battery pack which dissipates heat within the battery pack during charging of the cells as well as discharging of the cells while the battery pack is in use.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate an embodiment of the invention and together with the description serve to explain the principles of the invention. In the drawings, the same reference numerals indicate the same parts.

FIG. 1 is a partial cross-section view of a cordless power tool and battery in accordance with the present invention.

FIG. 2 is a partial cross-section view of a battery pack in accordance with the present invention.

FIG. 3 is a cross-section view of another embodiment of a battery pack in accordance with the present invention.

FIG. 4A is a cross-section view of another battery pack in accordance with the present invention.

FIG. 4B is an elevation view of the battery pack of FIG. 4A.

FIG. 4C is a cross-section view of another battery pack in accordance with the present invention.

FIG. 5 is another cross-section view of a battery pack in accordance with the present invention.

FIG. 6 is an additional cross-section view of another embodiment of a battery pack in accordance with the present invention.

FIG. 7 is an additional cross-section view of a battery pack in accordance with the present invention.

FIG. 8 is a cross-section view of an auxiliary fan module in accordance with the present invention.

FIG. 9 is a perspective view of a charger in accordance with the present invention.

FIG. 10 is a cross-section view of the auxiliary fan module coupled with the charger of FIG. 9 in accordance with the present invention.

FIG. 11 is a cross-section view of another embodiment of the present invention of a charger of FIG. 9.

FIG. 12 is a cross-section view like that of FIG. 8 of another embodiment of an auxiliary fan in accordance with the present invention.

FIG. 13 is a perspective view of a battery cooler/heater in accordance with the present invention.

DETAILED DESCRIPTION

Figure 14:
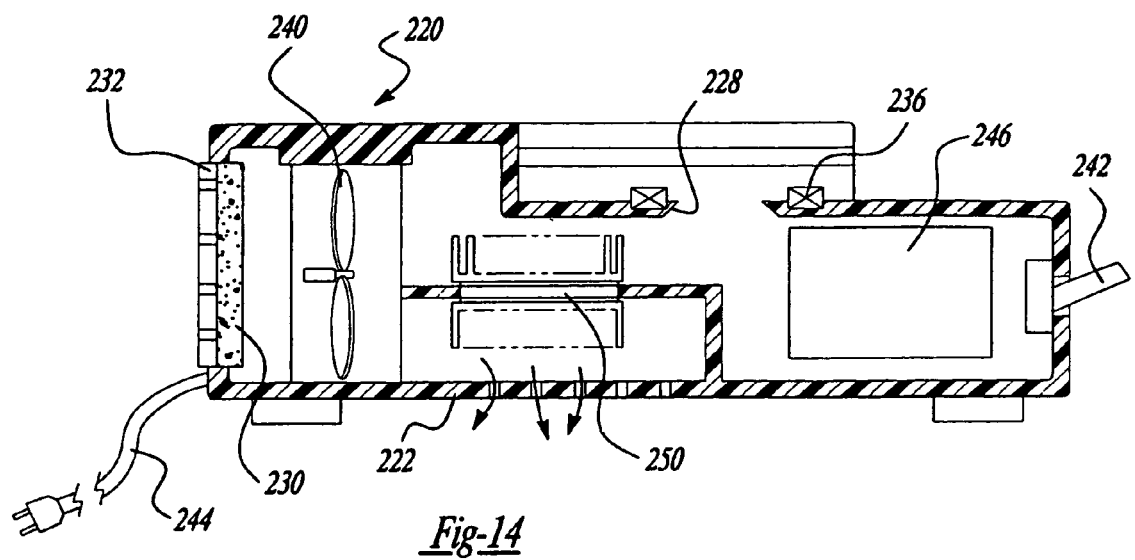
FIG. 14 is a longitudinal cross-section view of FIG. 13.

Turning to the figures, a cordless device is illustrated and designated with the reference numeral 20. The cordless device ordinarily includes a clamshell type housing 22. The housing 22 includes a mechanism 24 to couple with a portion of a battery pack 26. The cordless device 20 includes electrical elements 28 which couple with the battery pack electrical elements 29. Also, the device includes a trigger 30 which energizes the motor 32 within the housing 22.

The battery pack 26 includes a housing 34 which contains a plurality of battery cells 36 within the housing 34. Also, the housing 34 includes a ventilation system 38 which enables fluid to pass through the housing 34 and move around the cells 36 to dissipate heat from the plurality of cells 36 to the ambient air. The venting system 38 ordinarily includes at least one inlet 40 and at least one outlet 42. The inlet and outlet are ordinarily apertures or slots in the housing 34. Also, a channel 44 is formed within the housing 26 and aligned with the inlet 40 to distribute the fluid flow around the battery cells 36 so that all of the battery cells 36 are cooled. Preferably, the fluid flows coaxially with respect to the axes of the batteries 36. Thus, as fluid enters into the channel 44, the fluid is directed over the battery cells and does not pass over one cell to the next cell, etc., but is passed over a number of cells at one time so that the fluid passing through the housing is not warmed by the first cell and then passed over the second cell. However, fluid could be passed over the battery cells transversely with respect to the battery cells axes.

Turning to FIG. 2, an additional embodiment of a battery pack is shown. The battery pack 26 is like that illustrated in FIG. 1, including the housing 34, ventilation system 38 with inlet 40 and outlet 42. Also, cells 36 are positioned within the housing. Additionally, the battery pack includes one or more baffles 46, 48, 50 and 52. The baffles direct the fluid to specific battery cells 36. Ordinarily, the fluid is passed into channel 44 and distributed through the baffles 46 and 48.

Turning to FIG. 3, an additional embodiment of a battery pack is shown. Battery pack 60 includes a housing 62 with a venting system 64 which enables fluid to pass around the battery cells 66. The ventilation system 64 includes at least one inlet 68 and at least one outlet 70. Also, the battery housing includes a fan 72. The fan 72 may include a motor 74 which may run off of the battery cells 66. Also, the fan motor 74 may run off of a charging circuit when the battery pack is in a charger. The fan 72 moves fluid through the battery pack inlet. The fluid is forced over the battery cells 66 and out the outlets 70. Thus, a positive pressure is created in the battery pack as fluid flows through the battery pack as fluid flows through the battery pack 60. However, a negative pressure could be created in the battery pack sucking fluid through the battery pack. The channels 73 direct the fluid through the battery cells so that the fluid does not continue to pass from cell to cell but passes over different cells so that the cells experience the air at about the same temperature.

Also, the battery housing may include baffles 75, 76, 77, 78 like those described above.

Further, an auxiliary fan could be positioned in the tool housing itself as illustrated in phantom in FIG. 1 to move fluid through the battery housing.

Temperature sensors may be positioned in the housing to monitor individual battery cell temperature. Also, the baffles may be designed to direct fluid flow to the hottest battery cells. Thus, the cells would be cooled as well as the temperature being equalized.

Turning to FIGS. 4A and 4B, an additional embodiment of the present invention is illustrated. Here, the battery pack includes a housing 80, and a plurality of cells 36. Also, a heat sink 84 is positioned between the cells for wicking the heat from the battery cells 36. Projecting portions 86 surround the batteries to effectively move heat towards the fins 88 of the heat sink 84. Also, a plurality of slots 90 are formed in the housing 80 to enable the heat to be removed from the battery cells 36. The heat sink 84 may be of any type of metallic sink with the projecting portion 82 either being metallic or a thermally conductive medium, such as potting compound, gels or grease to extract the heat from the cells to the heat sink 84. The heat exits through the fins 88. Also, more fins, as well as larger projecting portions, surround battery cells which are known to have higher temperatures during charging of the battery as well as discharging when the tool is used. Thus, heat is drawn from the battery cells 36 to the heat sink. The ventilation slots 90 enable fluid to pass over the fins 88 to remove heat. Also, an inlet 92 may be included in the housing to enable fluid to pass from a fan in the tool housing through the battery pack.

FIG. 4C illustrates an additional embodiment of the present invention. The battery pack is similar to that in FIGS. 4A and 4B, except the housing 80' does not include the plurality of slots. The plurality of cells 36 are wrapped in a thermally conductive but electrically insulating substance such as tape 83 to enable heat to move from battery to battery via a heat sink 84. The heat sink 84 is positioned between the cells to wick heat from hotter battery cells and transfer the heat to battery cells having a lower temperature so that the temperatures of the cells are equalized within the pack. Projecting portions 86 surround the battery cells to effectively remove heat towards the fins of the heat sink 84. Cells which are known to have higher temperatures are designated with 36'. Further, the heat sink may be a metallic type like that mentioned above, or may include thermally conductive mediums such as potting compound, gels or grease to extract heat from hotter cells and move it to the heat sink which, in turn, distributes the heat to the remaining cells such that the temperature within the cells is equalized. Thus, the temperature equalization of the cells enables the cells to be charged and discharged at a substantially equal rate which improves and increases the life of the battery pack.

Turning to FIG. 5, an additional embodiment is illustrated. In FIG. 5, the battery pack includes a housing 100 surrounding a plurality of cells 36. The housing 100 includes a plurality of slots 102 which act as outlets and an inlet 104. Also, a heat pump 106 is positioned within the housing 100. The heat pump 100 is a Peltier device, which is commonly known in the art. The Peltier device is coupled with heat sinks 108 and 110, As the Peltier device is activated, one heat sink becomes cold while the other becomes hot. If the current through the Peltier device is reversed, the cold and hot sides reverse. Thus, the heat sinks 108, 110 can be used to provide cool air into the battery housing 100 and enable the air to be baffled by baffles 112, 114, 116 and 118 to pass over the battery cells 36 and exit the housing through the outlet slots. Thus, cool air would be passed into the housing to cool the batteries. In the event that the battery cells are cold, the Peltier device current could be reversed wherein heated fluid would be passed through the battery pack to warm the battery cells so that they could be charged. The Peltier device is coupled to electronics 120 which may function off of the battery cells, a charger, or both, to control the cooling or heating. Also, a temperature sensor 122 may be positioned in the housing, with respect to the battery cells, so that heating and cooling may take place as desired.

FIG. 6 is a view like that of FIG. 5 including the heat pump 106. Additionally, a fan 124 is positioned within the housing to move the fluid through the battery pack 100. Here, fluid can be channeled throughout the battery enabling the battery to be cooled.

Turning to FIG. 7, a battery pack is illustrated and designated with the reference numeral 130. Here, the battery pack is similar to that illustrated in FIG. 4, however, a fan 132 is positioned within the battery pack. The fan 132 moves fluid across the fins 88 in an attempt to expel the heat from the battery pack housing 130.

Turning to FIG. 8, an auxiliary fan module is illustrated and designated the reference numeral 140. The auxiliary fan module 140 includes a housing 142 which houses a fan 144. The housing includes an inlet 146 as well as an outlet 148. Fluid flows through the outlet 148, which is surrounded by seal 149, into the battery pack inlet 40 like that illustrated in FIGS. 1, 2. Electrical contacts 150 are positioned within the housing 142 to couple with the battery electrical contacts 29 to charge the battery cells 36. Further, electrical contacts 152 are secured with the housing 142 to mate with electrical contacts in a charger to run the fan during charging of the battery cells. Further, an electronic package 154 is within the housing 142 to control charging of the battery as well as operation of the fan 144. The electronic package 154 may be coupled with the temperature sensor to operate the fan as needed.

Turning to FIG. 9, a perspective view of a battery charger is illustrated and designated with the reference numeral 160. The charger 160 includes contacts 162 to couple with a battery pack or auxiliary fan module to charge a battery pack. The charger 160 includes a base 164 which includes the electrical contacts coupled with the base. Further a vent system 166, with inlet 167 and outlet 169, is coupled with the base 164 to enable air to pass into and through the battery charger and in turn the battery pack. Further, the battery charger includes an electronics package 168 which receives the current from an AC source and converts it into the DC source required to charge the battery pack.

The charger 160 may be utilized with the disclosed battery packs with or without fans in the battery pack. In the event a battery pack is used which does not include a fan, convection would be used to enable air flow through the vent system 160 and in turn through the battery pack. In a situation where the battery pack includes a fan, the contacts 162 would also couple with the fan electronics within the battery pack to for operating the fan. In this event, the electronics in the charger would electrically couple with the fan electronics to turn on and turn off the fan when needed.

Also, the charger could be utilized with the auxiliary fan module 140 as illustrated in FIG. 10. Here, the auxiliary fan module 140 is coupled with the electrical contacts 162 in the charger 160 to operate the fan 144 within the auxiliary fan module 140. Accordingly, the fan 144 may be turned on and off as desired.

Turning to FIG. 11, a charger 180 is shown. The charger 180 is similar to the battery charger 160 except that the battery charger 180 includes a fan 182 coupled with the venting system 166. The fan 182 moves fluid through an inlet 184 and forces the fluid through an outlet 186 into the battery pack. In this type of charger 180, the fan 182 would be activated as desired. Further, the charger electronics could be coupled with a sensor inside of the battery pack which would be activated through the electrical contacts 162. The sensor would sense the temperature within the battery pack so that the fan could run intermittently. Also, the sensors may be removed and the fan would just run constantly while the charger is operating.

Turning to FIG. 12, an auxiliary fan module is illustrated like that in FIG. 8. Here, the auxiliary fan module 190 includes a fan 192, an inlet 194 and an outlet 196 in the housing 198. Also, a heat pump 200 as described above is positioned within the housing 198. The heat pump would produce a cold heat sink 202 which would enable fluid to move into the housing, via the fan, and pass over the cold heat sink and into the battery pack. The fluid would also pass over the hot side of the heat sink 206, withdrawing heat from the housing, and exhausting the air to ambient through outlet 208. In the event the battery pack is cold, the heat pump 200 may be reversed and heat may be passed into the battery pack to warm the battery pack before charging. The fan module 190 also includes electrical contacts 210 to couple with the battery pack. Also, electrical contacts 212 couple with the charger 160. The electronics 214 within the auxiliary fan module 190 couple with the charger and operate the fan to move fluid into the battery pack as desired.

Figure 15:
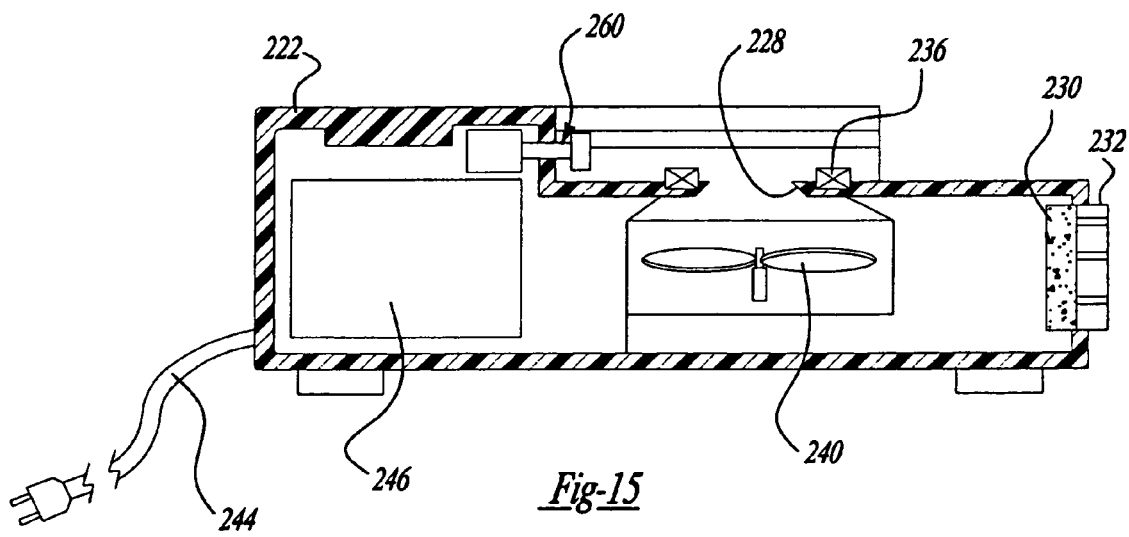
FIG. 15 is a view like FIG. 14 of an additional embodiment of the battery cooler/heater.

Turning to FIGS. 13-15, additional embodiments of the present invention are shown. FIG. 13 illustrates a perspective view of a battery cooler/heater device. Here, the battery cooler/heater 220 includes a housing 222. The housing 222 includes a battery receiving portion 224. The battery receiving portion 224 may be a cutout or the like in the battery housing 222 forming a depression to receive a battery housing pack. Further, the housing includes an inlet 226 and an outlet 228. The inlet enables fluid to pass into a duct in the housing 222 while the outlet enables the fluid to be passed out of the housing duct and into a battery pack. The inlet 226 is generally covered by a filter 230 and a grill 232 is attached to the housing 222 sandwiching the filter between the inlet and the grill 232. The grill 232 has slots 234 to enable air to pass through the grill into the filter and turn through the inlet 226.

An O-ring or some type of seal 236 is positioned around the outlet 228 as shown in FIG. 14. The seal 236 mates with the battery pack to prohibit fluid from escaping around the battery pack housing while fluid is passed into the battery pack housing.

In FIG. 14, the housing 222 includes a fan 240 to move fluid between the inlet 226 and outlet 228. The fan 240 is energized and de-energized by a switch 242. In FIG. 14, the switch 242 is a manual switch enabling the user to manually turn on and turn off the fan 240 as desired. Also, a power cord 244 is coupled with the fan and switch electronics 246 to provide power to the battery cooler/heater 220.

Additionally, a Peltier device 250 (illustrated in phantom) may be positioned near the inlet which may provide cooled or heated fluid which is drawn into the battery pack as described above. The Peltier device 250 would be coupled with the electronics 246 so that the Peltier device 250 may deliver cold or hot fluid flow, depending upon if cooling or heating is desired, to the battery cells.

Turning to FIG. 15, an additional embodiment of the battery heater/cooler 220 is shown. Here, the battery cooler is like that described above, except that an automatic switch 260 has replaced the manual switch 242. Here, as the battery pack housing is slid into the battery cooler/heater housing, the battery contacts the normally open switch 260 energizing the fan 240. As the battery pack housing is withdrawn from the battery cooler/heater, the switch 260 would return to its normally open position, de-energizing the fan.

Figure 16:
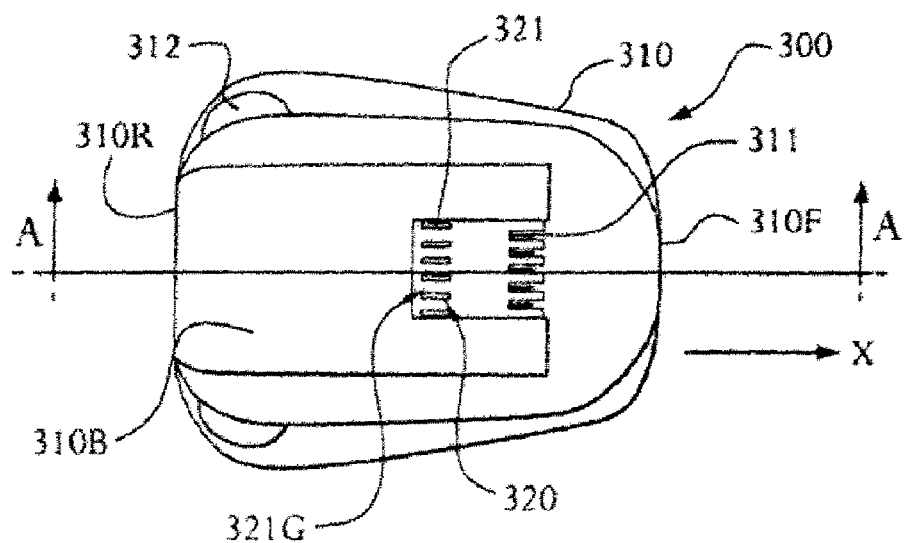
FIG. 16 is a top plan view of an additional embodiment of a battery pack in accordance with the present invention.
Figure 17:
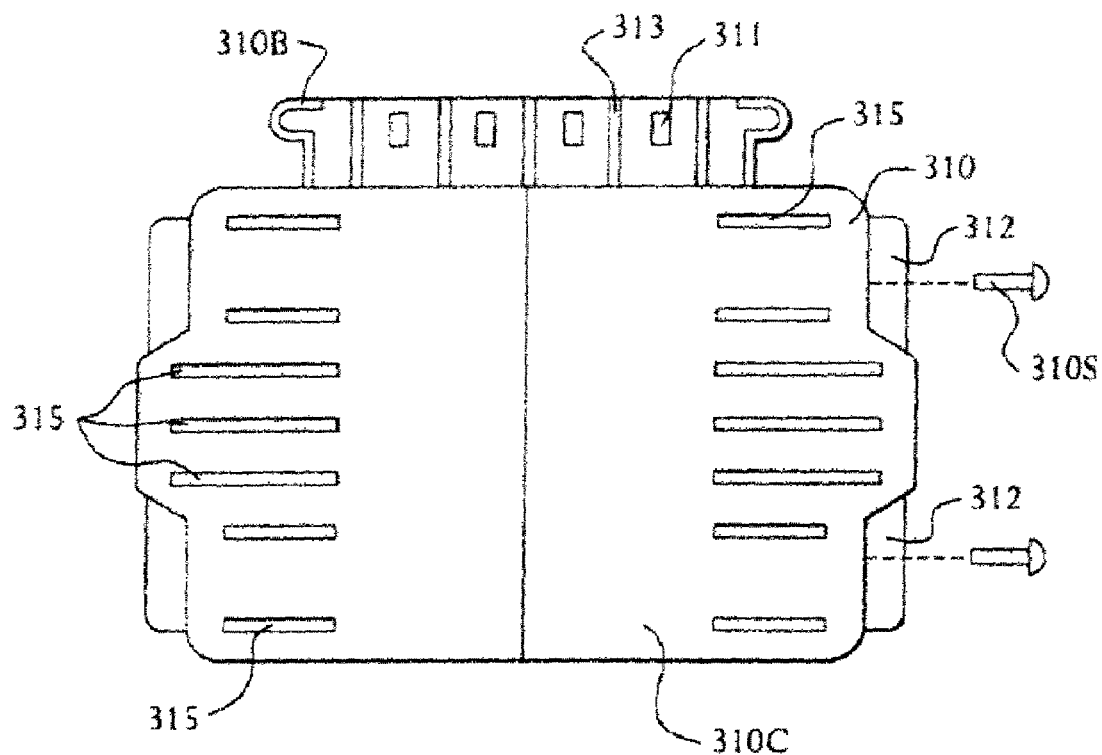
FIG. 17 is a front elevational view of the battery pack of FIG. 16.
Figure 21:
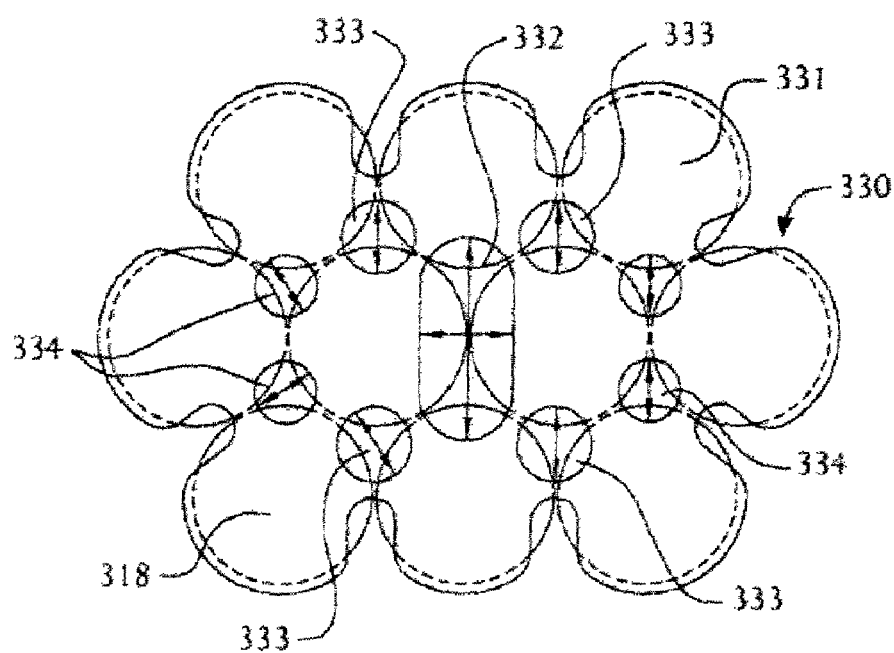
FIG. 21 is a front view of the insulation plate according to the present invention.
Figure 18:
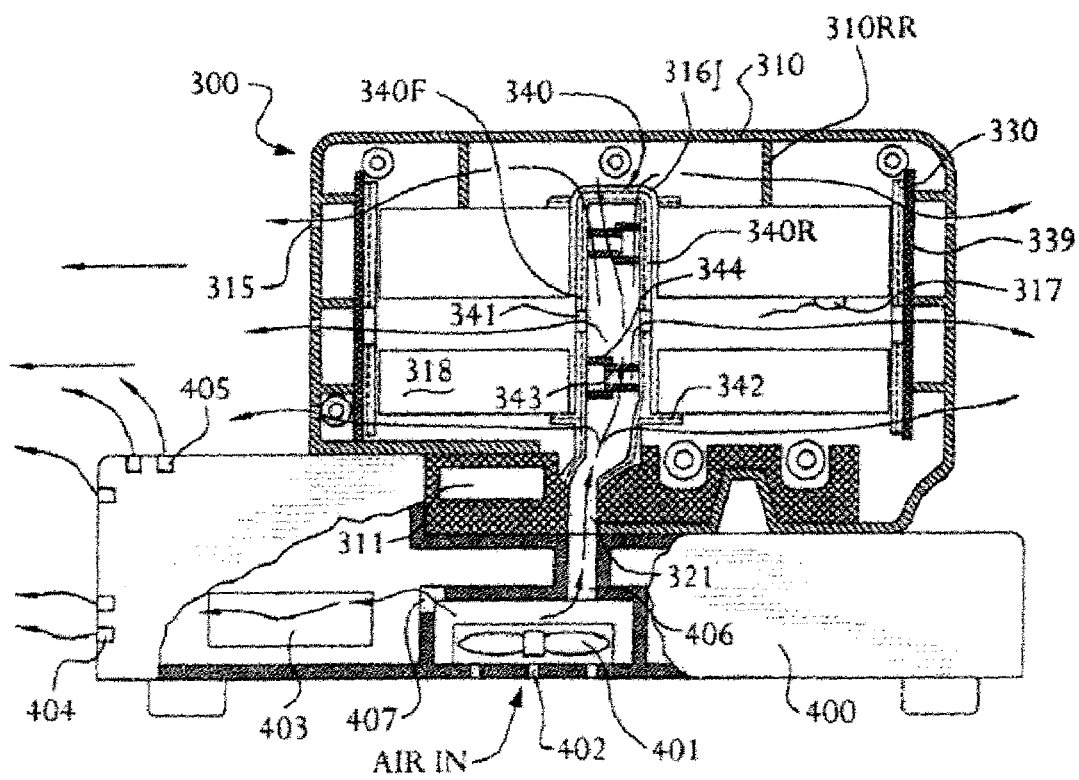
FIG. 18 is a partial cross-sectional view of the battery pack of FIG. 16 along line A-A of FIG. 16 and another embodiment of the charger.
Figure 22:
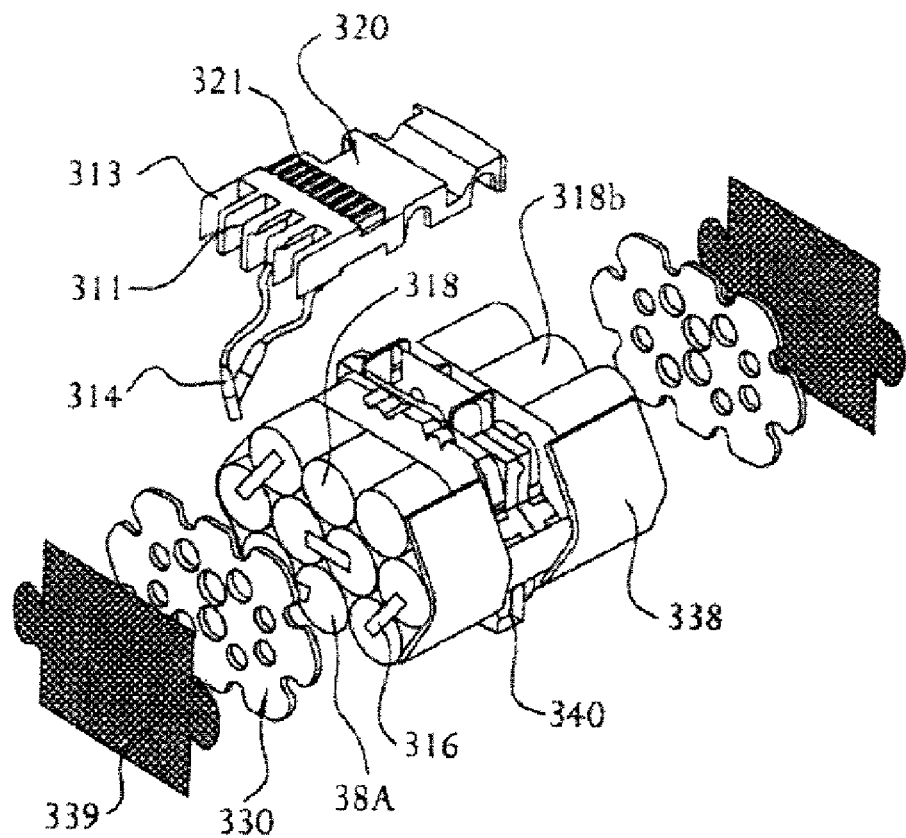
FIG. 22 is an exploded perspective view of components of the battery pack of FIG. 16.
Figure 23:
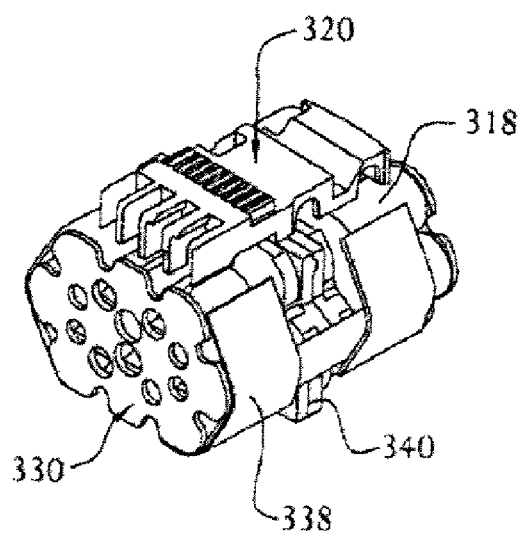
FIG. 23 is a perspective view of the assembled components shown in FIG. 22.
Figure 24:
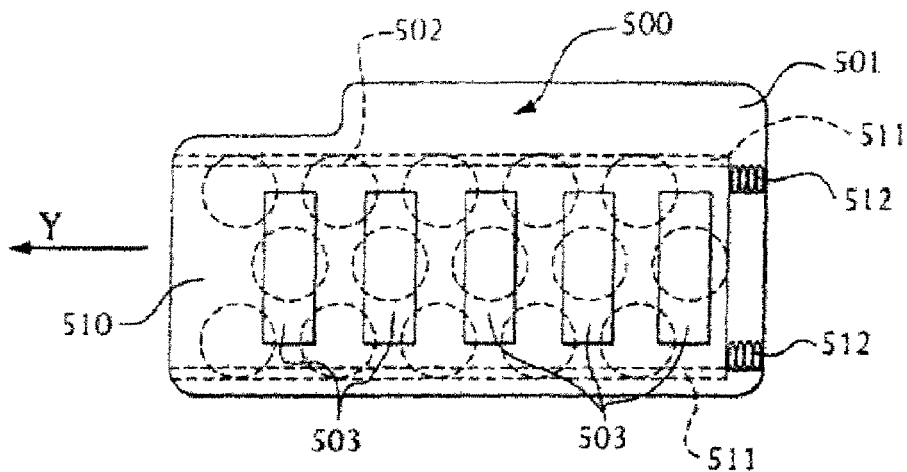
FIG. 24 is a side elevational view of another battery pack according to the present invention.
Figure 25:
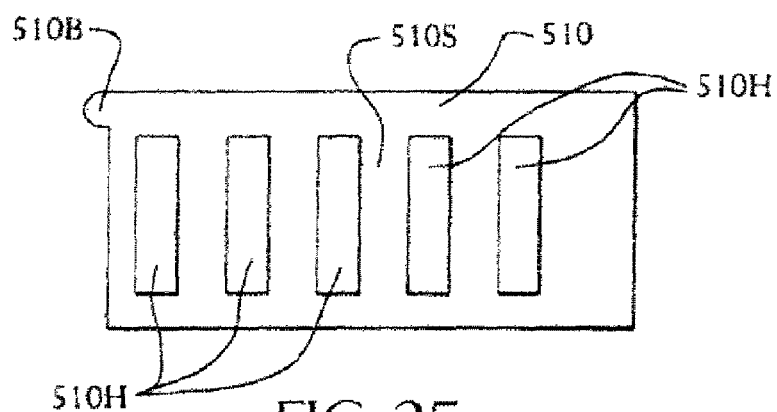
FIG. 25 is a side elevational view of the opening sealer of the battery pack of FIG. 24.
Figure 26:
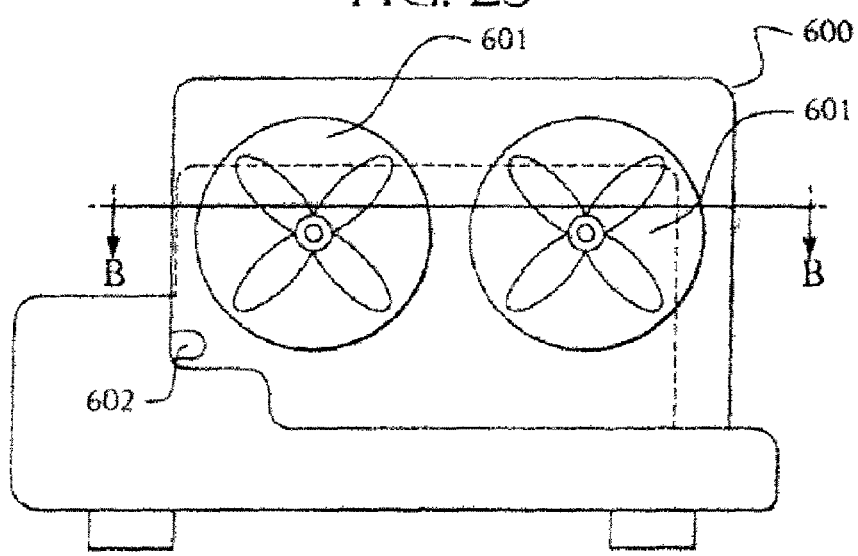
FIG. 26 is side elevational view of the charger used with the battery pack of FIG. 24.
Figure 27:
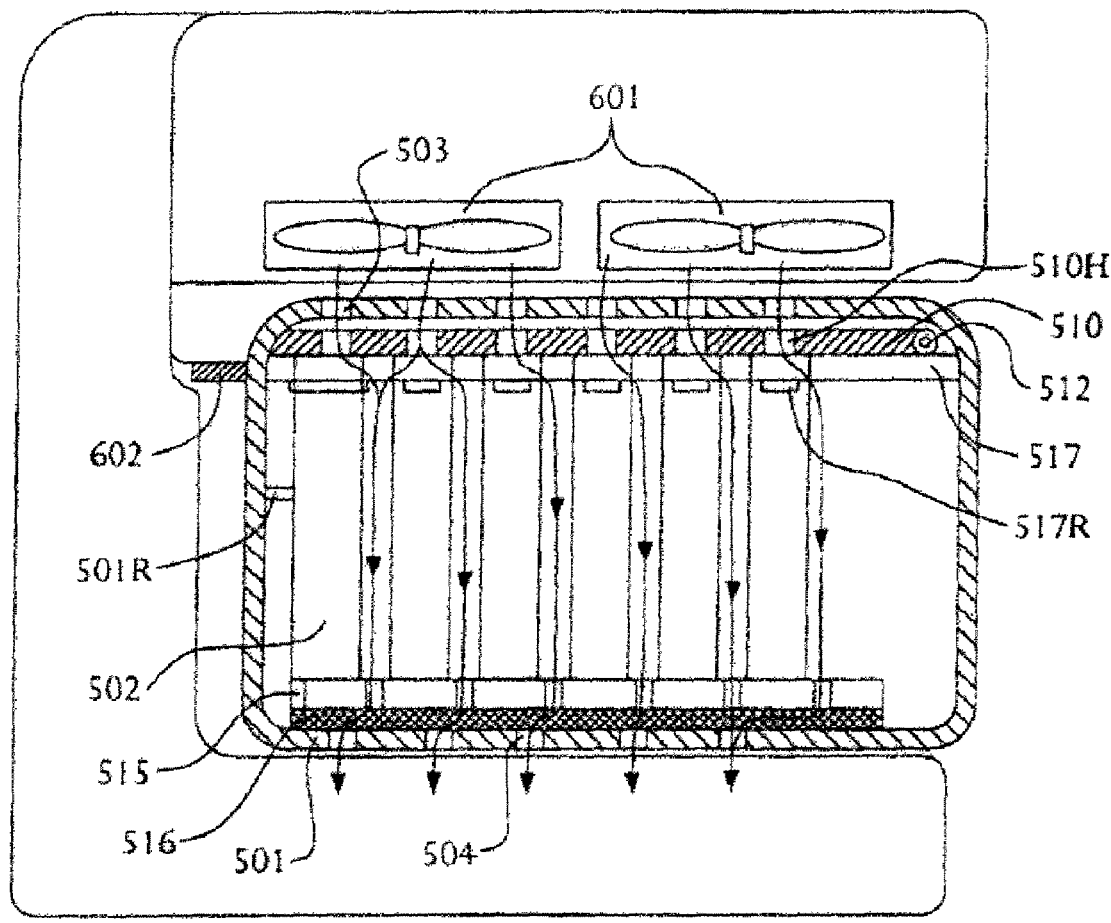
FIG. 27 is a partial top plan cross-sectional view of the battery pack of FIG. 24 along line B-B of FIG. 27 and the charger of FIG. 27.

Referring to FIGS. 16-18, a battery pack 300 has a housing 310, at least one cell 318 enclosed in the housing 310 and terminals 311 connected to the cell 318.

Preferably the housing 310 comprises two clamshell halves 310C held together by screws 310S. The housing 310 may also have an upper tower 310B where the terminals 311 are disposed. A cell 318 may be disposed within the tower 310B. Exhaust holes 315 are preferably disposed on the front wall 310F and/or rear wall 310R of the housing 310.

Because battery pack 300 is inserted into a tool or charger by sliding the entire pack 300 along direction X, it is preferable to provide protrusions 312 on the side walls of the housing 310. Preferably protrusions 312 extend from the side walls so as to provide the user with a grasp on the housing 310 when removing the battery pack 300 from the tool or charger.

Persons skilled in the art will recognize that in the present case direction X is substantially parallel to the terminals 311 and/or the longitudinal axis of battery pack 300. However, such persons should also recognize the direction X may be at an angle off the terminals 311 and/or the longitudinal axis of battery pack 300.

Preferably terminals 311 are disposed on duct assembly 320. Duct assembly 320 may have walls 313 disposed between terminals 311. In addition, duct assembly 320 may include a duct path 321. The duct assembly 320 may also have a duct grill 321G to prevent dust, chips or other things from entering duct path 321.

Duct path 321 may be connected to a hollow plenum 340. The plenum 340 preferably has opposing walls 340R and 340F. Each wall may have bosses 344 contacting bosses 343 disposed on the other wall. Plenum 340 may be built of one piece, or of multiple pieces assembled together.

Figure 20:
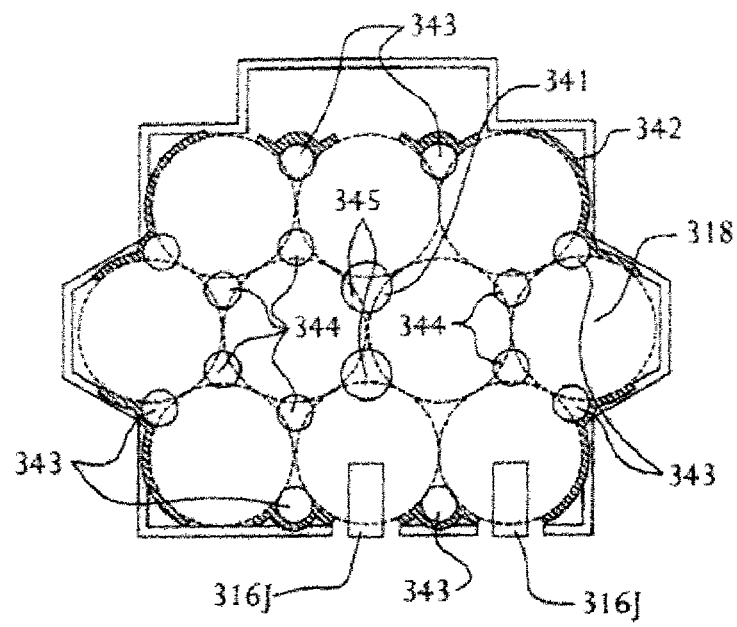
FIG. 20 is a front view of the battery pack plenum according to the present invention.

Preferably cell 318 is disposed against plenum 340. Referring to FIGS. 18 and 20, it is preferable to dispose 10 cells on both sides of plenum 340. Ribs 342 may hold each cell or a group of cells in place. Internal ribs 310RR may also hold each cell or a group of cells 318 in place relative to plenum 340.

With such arrangement, air or fluid entering through the duct path 321 will flow into the plenum 340. The plenum 340 preferably has holes 341 for allowing the air or fluid to escape therefrom and to flow along the cells 318 towards the outlet holes 315 on housing 310.

It has been found that cells 318 closest to the center of the pack 300 tend to cool slower than those cells farthest from the center of the pack 300. If the holes on the plenum 340 have the same diameter, all cells will receive the same air or fluid flow. However, by altering the size of holes, it is possible to control the air or fluid flow along cells 318 and thus allow more air or fluid to flow along the cells closest to the center of the pack, than to the cells farthest from the center of the pack.

Accordingly, a plenum wall may be provided with the smallest holes 343 towards the periphery of the cell cluster, i.e., the group of cells. Similarly, the plenum wall may be provided with the largest holes 345 at or near the center of the cell cluster. The plenum wall may be provided with mid-size holes 344 in between. Preferably the holes are disposed between two or three cells 318.

In a battery pack 300 with cells 318 which have a diameter of about 22.5 mm, the diameters of holes 343, 344, and 345 would preferably be about 6 mm, about 8 mm and about 12 mm, respectively. In other words, the diameters of holes 343, 344 and 345 would be about 0.267, about 0.355, and about 0.533 times the diameter of cells 318, respectively.

At the end of the cells 318 farthest away from the plenum 340, it is preferable to provide an insulation plate 330, as shown in FIGS. 18 and 21-23. Preferably, the insulation plate 330 is made of a non-conductive material, and it may have an adhesive material disposed on both sides of the plate 330.

To assist in the cooling of the cells 318, the plate 330 also have holes disposed thereon. Preferably, these holes have different diameters.

Accordingly, the plate 330 may be provided with a center hole 332. The plate 330 may be provided with holes 334 and 333. Holes 334 are further than holes 333 from center hole 332. Accordingly, it is preferable to make holes 334 smaller than holes 333. Preferably the holes are disposed between two or three cells 318.

In a battery pack 300 with cells 318 which have a diameter of about 22.5 mm, center hole 332 is preferably about 12 mm wide and 25 mm long. Also, the diameters of holes 333 and 334 would preferably be about 8 mm and about 10 mm, respectively. In other words, the diameters of holes 333, 334 would be about 0.355, and about 0.444 times the diameter of cells 318, respectively.

Filter 339 is preferably disposed on plate 330 to prevent dust from and/or limit the amount of dust entering the housing 310 through holes 315. Preferably filter 339 is made of a synthetic fabric mesh.

Battery pack 300 may also have a temperature indicating device 317 connected to terminals 311, to indicate the temperature of cells 318. Such temperature indicating device 317 may be a thermistor, a capacitor, a thermostat, etc. The temperature indicating device 317 may be provided between a cell 318 and the plenum 340 (see FIG. 19), or on a cell 318 or between cells 318 (see FIG. 18).

If provided on a cell 318, the temperature indicating device 317 may be taped onto cell 318. The temperature indicating device 317 may be covered so that it be not exposed to the air or fluid flow. Alternatively, the temperature indicating device 317 may be left uncovered and exposed to the air or fluid flow.

Accordingly the battery pack 300 may be manufactured as follows: a person would take 10 cells 318 and form first and second clusters 318A, 318B. Preferably, the person would wrap tape around the clusters 318A, 318B to hold them together. Lead plates 316 are then connected to the different cells 318.

The terminals leads 314, which are connected to terminals 311, are also connected to two cells 318. Depending on the preferred embodiment, a temperature indicating device 317 may be disposed between cells 318, or attached to a cell 318 or to the plenum 340. Jumper leads 316J are then connected to bridge two cells of both clusters 318A, 318B. (In this manner, both clusters will constitute a series of battery cells. Persons skilled in the art should recognize that other lead connecting arrangements may be implemented if it is preferred to dispose cells in parallel or series-parallel arrangements, etc.)

The first cluster 318A can then be disposed on one side of the plenum 340. Similarly, the second cluster 318B can be disposed on the other side of the plenum. Preferably the clusters 318A, 318B will engage plenum ribs 342.

Insulation plates 330 and filters 339 can then be disposed on the clusters 318A, 318B. The duct assembly 320 is then disposed on plenum 340. The entire assembly is then disposed in the housing clamshells 310C. Screws 310S are preferably used to attach both clamshells 310C.

Foam or rubber pads may be disposed on the different elements to ensure a good fit with housing 310. For example, rubber pads 338 may be disposed on the clusters 318A, 318B, etc.

Referring to FIG. 18, a charger 400 is used for charging battery pack 300. The charger 400 may have a fan 401 for moving air or fluid through battery pack 300. In other words, this fan 401 may blow or suck air or fluid through battery pack 300. For the sake of convenience, the embodiment disclosed herein will show air being blown from the charger to and through the battery pack 300, but persons skilled in the art are advised that other fluids may be moved therethrough, and/or that the air or fluid may flow from the battery pack 300 into the charger 400 or the atmosphere.

As shown in FIG. 18, fan 401 preferably moves air or fluid through battery pack 300 via a duct 406. Cool air may be brought in through inlet holes 402 disposed on the charger 400. Duct 406 connects with duct 321. Preferably both ducts are flushed together so that no gap exists therebetween. Furthermore, both ducts may also be axially aligned.

Fan 401 may also have an outlet 407 for blowing air through the charger 400, so as to cool the charger electronic components 403. Outlet holes 404 are disposed on charger 400 so as to allow warmer air to exit.

Charger 400 may also have outlet holes or vents 405. Accordingly, air exiting from the battery pack 300 may form a low pressure region above vents 405, "pulling" air from the charger 400 outwardly. This would promote air cooling of the charger electronic components 403.

Figure 19:
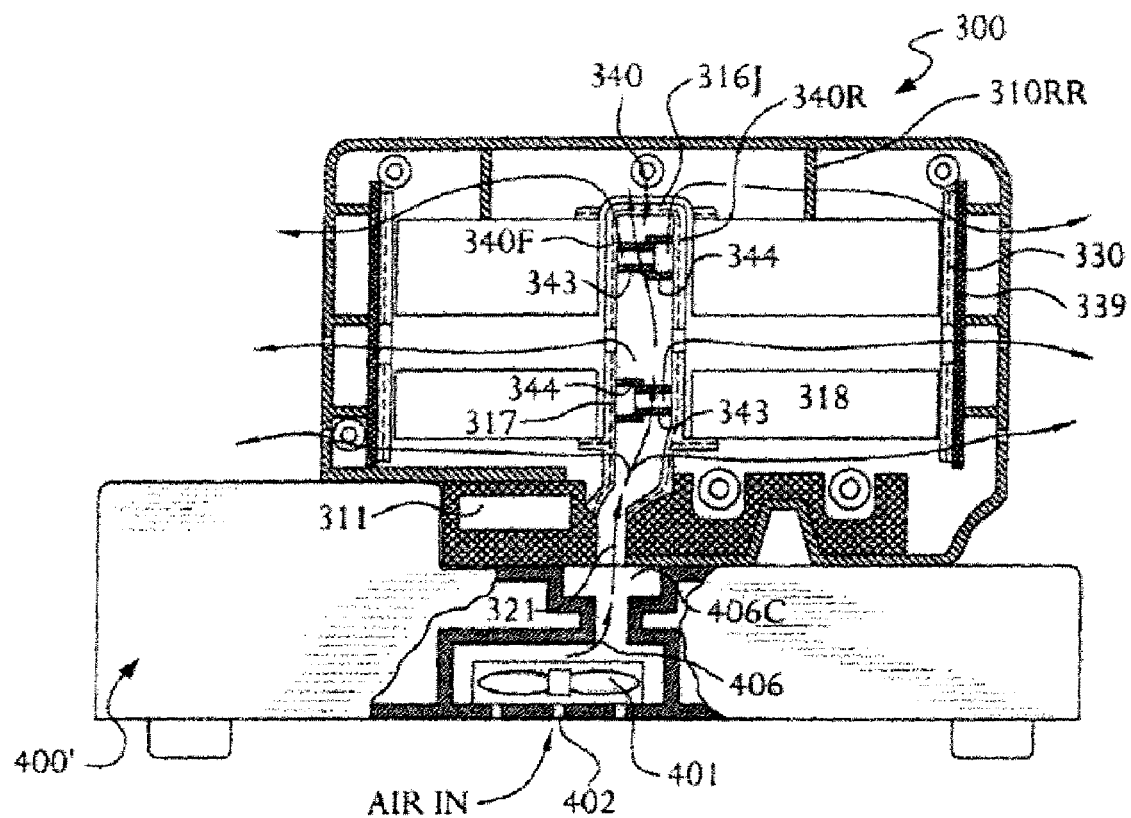
FIG. 19 is a partial cross-sectional view of the battery pack of FIG. 16 along line A-A of FIG. 16 and another embodiment of the charger.

FIG. 19 shows a similar charger 400'. In this charger, ducts 406 and 321 are not flushed together. Instead, a chamber 406C is disposed therebetween. Second, ducts 406 and 321 are not axially aligned.

It is known in the art to turn on the fan 401 when the battery pack 300 is inserted and to turn it off completely when the charging process is completed or the battery pack 300 is removed. However, other fan modulation processes are also useful.

First, it is preferable that fan 401 is turned on for a predetermined period and turned off before a battery pack 300 is disposed on the charger. This period could occur when the charger 400 is either turned on, connected to an outlet or when a button on the charger is pushed. This would blow foreign particles, such as dust, that has settled on duct 406 and/or chamber 406C. Accordingly, such particles would not be blown into the battery pack 300 during charging. This result can also be achieved if the fan 401 is always on, on after the battery pack 300 has been removed, or if the fan 401 is periodically turned on and off when the battery pack 300 is not disposed in the charger.

In addition, rather than fan 401 being completely turned off, it may be expedient to just regulate the power sent to fan 401 so that fan 401 rotates at a lower speed. Accordingly, fan 401 can rotate at a first speed before the battery pack 300 is disposed on the charger 400. When the battery pack 300 is disposed on the charger 400, the fan 401 can rotate at a second speed, which is higher than the first speed. When the battery pack 300 is then removed, the fan 401 can be turned off completely or brought back to a lower speed. This would also help in maintaining the duct 406 dust-free.

Accordingly, it may be preferable to turn on fan 401 at a high first speed for a predetermined period and then lower the speed before a battery pack 300 is disposed on the charger. This period could occur when the charger 400 is either turned on, connected to an outlet or when a button on the charger is pushed.

Furthermore, the charger 400 can control the speed of fan 401 by using information from the temperature indicating device 317. For example, the charger 400 would receive information from the temperature indicating device 317. If the battery pack 300 is too cold, e.g., below 20° C., the charger 400 would lower the speed or stop fan 401. Similarly, the charger can control fan 401 so as to maintain the temperature of battery pack 300 around a predetermined point, such as about 30° C.

In addition, charger 400 can control fan 401 so as to obtain accurate information from the temperature indicating device 317. For example, in an embodiment discussed above, the temperature indicating device 317 was exposed to the air or fluid flow. Accordingly, the temperature indicating device 317 would show a cell temperature lower than the actual cell temperature. This would render the different temperature-based charge termination processes useless.

Such result can be avoided if the charger 400 periodically lowers the speed of or stops fan 401 for a predetermined period of time. This would allow temperature indicating device 317 to show a more accurate cell temperature, which can then be read by the charger 400 and used in its temperature analysis. The charger 400 can then increase the speed of or start fan 401 until the next time the charger 400 needs temperature information.

Another battery pack and charger are shown in FIGS. 24-27. The teachings of the above embodiments are incorporated herein. In the present embodiment, battery pack 500 has a housing 501. Housing 501 contains cells 502 disposed horizontally and/or substantially perpendicular to the direction of insertion, i.e., direction Y, and/or to the longitudinal axis of battery pack 500.

Housing 501 has holes 503 on one side. A slidable door 510 is disposed near holes 503 for sealing them. Door 510 may be disposed inside or outside housing 501. Housing 501 may have rails 511 slidably receiving door 510. Door 510 may have alternating slats 510S and holes 510H. Accordingly, when door 510 is in an open position, holes 510H align with holes 503, allowing air or fluid to enter battery pack 500. When door 510 is in a closed position, slats 510S align and substantially close or seal holes 503. Preferably, springs 512 connected to housing 501 bias door 510 towards the closed position.

When battery pack 500 is disposed on a charger 600 for charging, the battery pack 500 is moved along the direction of insertion, causing protrusion 602 to contact door 510 and/or door protrusion 510B. This in turn would cause door 510 to move towards the open position.

When in the open position, air blown by fans 601 will enter through holes 503, go through holes 510H, flow along cells 502, and exit through holes 504 disposed on the housing 501. Persons skilled in the art will recognize that the cells 502 may be disposed on a plate 517 and held in place by plate ribs 517R or housing ribs 501R. As before, it is preferable to provide an insulation plate 515 and a filter 516.

In addition, persons skilled in the art should recognize that fans 601 can also suck air, so that the air enters and exits the battery pack 500 through holes 504 and 503, respectively.

While the above detailed description describes the preferred embodiment of the present invention, the invention is susceptible to modification, variation, and alteration without deviating from the scope and fair meaning of the subjoined claims.

The invention claimed is:

1. A battery pack to be operatively associated with an electrical appliance, said battery pack comprising:
   a housing having a top, a bottom and a side wall portion;
   at least one cell disposed in the housing;
   an air-flow chamber disposed in the housing proximate one end of the cell and positioned adjacent a top portion of the housing;
   an inlet defined by the housing, the inlet communicating with the chamber and the outside of the housing;
   an outlet defined by the housing, the outlet being disposed generally opposite the inlet;
   a passageway connecting the chamber with the outlet; and
   a screen member disposed in the housing.

2. The battery pack of claim 1, wherein the inlet is positioned adjacent the air-flow chamber.

3. The battery pack of claim 2, wherein the air-flow chamber distributes air around the cell.

4. The battery pack of claim 3, wherein a channel is positioned between the air-flow chamber and the cells to direct air around the cell.

5. The battery pack of claim 4, comprising a plurality of channels.

6. The battery pack of claim 5, wherein a majority of the channels have a uniform shape.

7. The battery pack of claim 6, wherein the majority of channels are circular shaped.

8. The battery pack of claim 5, wherein the majority of channels have the same shape.

9. A power tool system comprising: a power tool;
   a battery pack electrically connectable to the power tool, said battery pack comprising a pack housing, at least one cell disposed in the pack housing, an air-flow chamber disposed in the pack housing proximate one end of the cell, an inlet defined by the pack housing, the inlet communicating with the chamber and the outside of the pack housing, an outlet defined by the pack housing, the outlet being disposed generally opposite the inlet, a passageway connecting the chamber with the outlet, and a screen member disposed in the pack housing; and
   a charger electrically connectable to the battery pack for charging the battery pack.

10. The system of claim 9, wherein the charger has a charger housing, a fan disposed within the charger housing for moving air, and a housing air outlet on the charger housing for allowing air to exit the charger housing and enter the battery pack through the air inlet.

11. The system of claim 9, wherein the pack housing has a top, bottom and sidewall portion.

12. The system of claim 11, wherein the air-flow chamber is positioned adjacent the top portion of the pack housing.

13. The system of claim 12, wherein the inlet is positioned adjacent the air-flow chamber.

14. The system of claim 13, wherein the air-flow chamber distributes air around the cell.

15. The system of claim 14, wherein a channel is positioned between the air-flow chamber and the cells to direct air around the cell.

16. The system of claim 15, comprising a plurality of channels.

17. The system of claim 16, wherein a majority of the channels have a uniform shape.

18. The system of claim 17, wherein the majority of channels are circular shaped.

19. The system of claim 16, wherein the majority of channels have the same shape.

* * * * *